T. MIDGLEY.
UNWINDING MACHINE.
APPLICATION FILED MAR. 7, 1914.
1,176,686.
Patented Mar. 21, 1916.
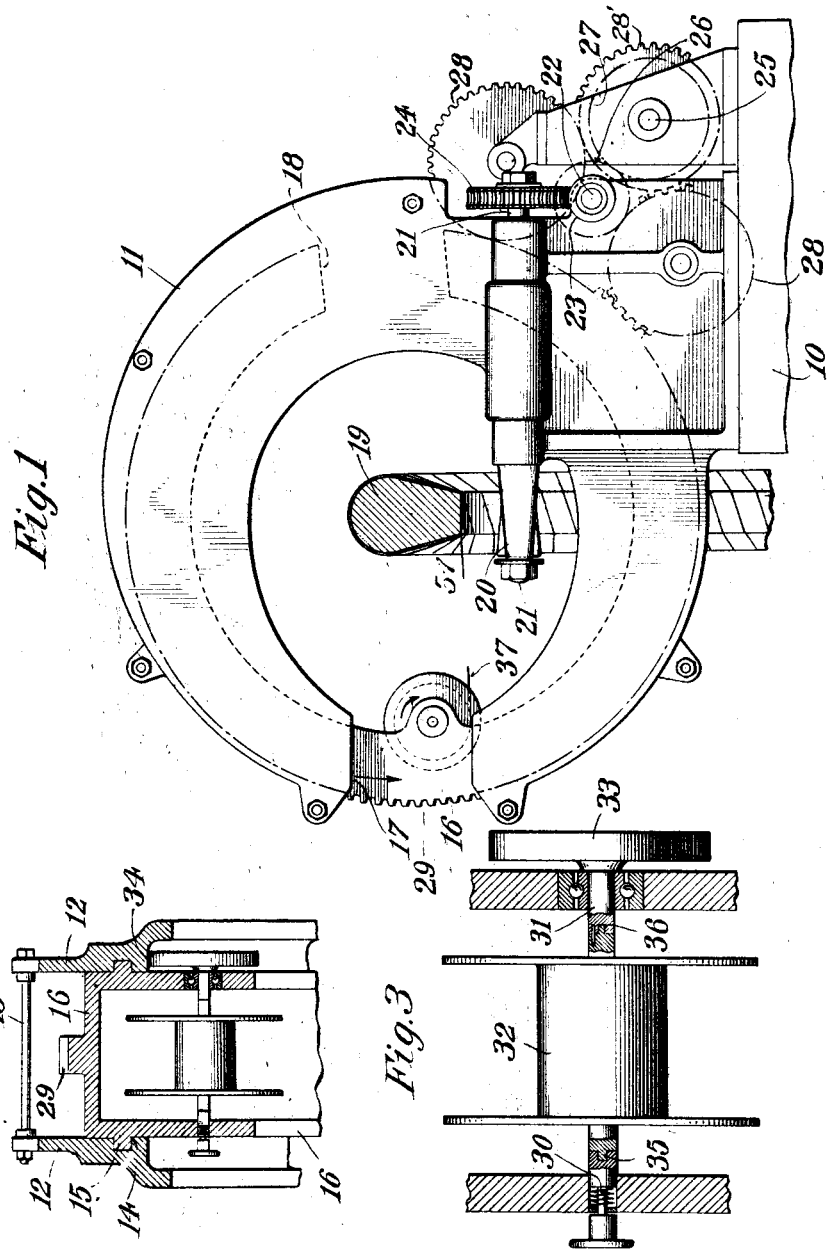
Thomas Midgley
Inventor

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

UNWINDING-MACHINE.

1,176,686.   Specification of Letters Patent.   Patented Mar. 21, 1916.

Application filed March 7, 1914. Serial No. 823,156.

*To all whom it may concern:*

Be it known that I, THOMAS MIDGLEY, a citizen of the United States, residing at Worthington, county of Franklin, and State of Ohio, have invented certain new and useful Improvements in Unwinding-Machines, of which the following is a full, clear, and exact description.

This invention relates to machines for removing a wrapping of fabric or the like from shoes or casings of pneumatic tires after vulcanization.

When shoes or casings or pneumatic tires are vulcanized or cured, it is customary to support these shoes or casings upon a ring core, and to apply to the outer surface of the casings so supported, a wrapping of lengths of spirally wound fabric through which the heated gas of the vulcanizing chamber penetrates for vulcanizing the tire. After vulcanization, this wrapping of fabric is removed by hand, the successive turns of the wrapping being unwound transversely from around the tire shoe or casing and deposited in piles preparatory to being spooled.

The present invention has for its object, the provision of a machine by which the fabric may be unwrapped from the tire shoe or casing after vulcanization. And the invention further provides a machine by which the unwrapping of the tire shoe or casing may be carried on more expeditiously than it can be done by hand, in that the fabric material will be reeled or spooled during the unwrapping process.

With the above objects in view, the invention consists in certain details of construction and the combinations of parts hereinafter fully described and claimed, it being understood that various modifications may be resorted to within the scope of the appended claims.

In the accompanying drawings forming part of this specification—Figure 1 is a side elevation of the machine; Fig. 2 is a fragmentary sectional view showing the spool and its drive; Fig. 3 is an enlarged detail view showing the spool and its mountings.

Referring now to the drawing, in which like characters of reference designate similar parts, 10 designates the main frame of the machine, on the top of which is mounted an annular shuttle-guide 11, consisting of a pair of castings 12 bolted together as shown at 13. The castings are provided on their inner faces with annular guide channels 14 to receive corresponding guide-ribs 15 formed on the faces of an annular shuttle 16. Both the shuttle-guide and the shuttle are interrupted as shown at 17 and 18 to form gaps, which may be brought into coincidence so that the tire shoe or casing with its supporting ring core, indicated at 19, may be introduced within both the shuttle and the guide. To hold the ring core and the tire in proper position relative to the shuttle, oppositely tapered conical supports 20 are provided at opposite sides of the shuttle. These supports are turned slowly for imparting a slow rotation to the ring core and tire in order or move the same in a path transverse of the shuttle during the unwrapping operation, the tire and its ring core advancing a few inches at each complete revolution of the shuttle. Each of the supports 20 is mounted on a shaft 21 which is connected for turning with a shaft 22 by worm-gears 23 and 24, the shaft 22 being driven from the main drive-shaft 25 by meshing gears 26 and 27.

Rotation is imparted to the shuttle 16 by a pair of gears 28 which engage a curved rack 29 formed on the periphery of the shuttle, and are driven from a gear 28' on the main shaft. The gears 28 engage the rack at points sufficiently far apart to insure the engagement of one of the gears with the rack when the gap 18 in the shuttle is passing the other gear and both these gears are driven from a gear 28' on the main shaft.

The shuttle is provided with a spring-pressed pin 30 which is mounted on one side-wall of the shuttle as shown best in Fig. 3, and is provided in the opposite side-wall with a stub-shaft 31, the pin and stub-shaft forming supports for a reel or spool 32 which unwraps and spools the material unwrapped from the tire. The stub-shaft is equipped with a friction drive-wheel 33 which rides upon an annular track 34 formed on the inner face of one of the castings 12. The stub-shaft and pin interlock with the spool as shown respectively at 35 and 36. This spool is rotated by the drive-wheel 33 which, together with the track, is proportioned to drive the spool at a faster speed than the speed of the unwinding of the fabric 37 from the tire, whereby the slack in the fabric, caused by the intermittent slowing up of the spool as the wheel passes through the gap 17 in the track, will be quickly taken up when the wheel again comes into engagement with the track. There is consequently a slight slip of the drive-wheel on the track during the rotation of the shuttle with a resultant tensioning of the fabric as it is unwound from the tire. The gaps in the guide and track expose the spool, as best shown in Fig. 1, for manual application thereto of the ends of the various lengths of fabric of which the wrapping is composed. When the spool is so exposed it may be rotated idly until a sufficient length of the end of the fabric is wound thereon to give the spool a purchase for spooling the fabric, it being understood, of course, that the machine must be stopped to hold the spool in the gaps during this operation.

In operation the tire with its supporting core is first introduced within the shuttle and the shuttle-guide and is mounted upon the conical supports 20. The end of the strip of wrapping material is given a couple of turns about the spool to give the latter a purchase upon the material. The machine is then set in operation and the tire and its supporting core are slowly rotated in their own plane as indicated in Fig. 1. The shuttle is turned in the direction indicated in Fig. 1 and carries the spool around the tire and its supporting core. The spool is rotatably driven during this passage around the tire and core whereby the material is unwound from the tire in consecutive whirls and is spooled upon the spool, the speed of rotation of the spool being such that the material is tensioned during such spooling. When the wrapping is entirely removed from the tire, the tire will be removed and replaced with another tire, the filled spool also being removed, if necessary, by withdrawing the spring-pressed pin 30, and replaced with an empty spool ready for another unwrapping operation.

Having thus described my invention, what I claim and desire to protect by Letters Patent is:

1. A device of the class described, comprising an annular shuttle support, an annular shuttle rotatably mounted therein, means for mounting a tire spirally wrapped with lengths of fabric to revolve in a path through the shuttle, a take up spool for the fabric carried by the shuttle, the support and the shuttle having each an open gap adapted to be brought into registry to permit application and removal of a tire therethrough, the support gap serving to expose the spool for manual application of the ends of the lengths of fabric thereto during the unwrapping operation, and a friction wheel driving the spool from the support and permitting idle rotation of the spool when in the gap thereof to facilitate application of said ends of fabric.

2. A device of the class described comprising an annular shuttle support, an annular shuttle rotatably mounted therein, means for mounting a tire wrapped with lengths of fabric to revolve in a path through the shuttle, an annular track on the support, the support, the shuttle, and the track, each having an open gap adapted to be brought into registry to permit application and removal of a tire therethrough, the support and track gaps serving to expose the spool for manual application of the ends of the lengths of fabric thereto during the unwinding operation, and a friction wheel driven from the track and permitting idle rotation of the spool when in the gap thereof to facilitate application of said ends of fabric, the friction wheel and the track being proportioned to drive the spool faster than the unwinding of the fabric whereby slack therein as the spool slows up when the friction wheel leaves the track and enters the gap will be quickly taken up when the wheel comes again into contact with the track.

Signed at Detroit, county of Wayne, State of Michigan, this 27th day of February, 1914.

THOMAS MIDGLEY.

Witnesses:
J. H. SWIFT,
E. LA BUSCHEWSKY.